US011364642B2

United States Patent
Huang et al.

(10) Patent No.: US 11,364,642 B2
(45) Date of Patent: Jun. 21, 2022

(54) WAIST JOINT OF HUMANOID ROBOT AND HUMANOID ROBOT

(71) Applicant: Beijing Institute of Technology, Beijing (CN)

(72) Inventors: Qiang Huang, Beijing (CN); Junyao Gao, Beijing (CN); Chunlei Zhang, Beijing (CN); Weimin Zhang, Beijing (CN); Xuechao Chen, Beijing (CN); Dingkui Tian, Beijing (CN)

(73) Assignee: Beijing Institute of Technology

( * ) Notice: Subject to any disclaimer, the term of this patent is extended or adjusted under 35 U.S.C. 154(b) by 182 days.

(21) Appl. No.: 16/856,010

(22) Filed: Apr. 22, 2020

(65) Prior Publication Data

US 2021/0008734 A1 Jan. 14, 2021

(30) Foreign Application Priority Data

Jul. 11, 2019 (CN) .......................... 201910626657.1

(51) Int. Cl.
*B25J 17/00* (2006.01)
*B25J 9/00* (2006.01)

(52) U.S. Cl.
CPC .............. *B25J 17/00* (2013.01); *B25J 9/0006* (2013.01)

(58) Field of Classification Search
CPC ...... B25J 17/0258; B25J 9/0006; B25J 17/00; B25J 17/025; B25J 17/0241; B25J 17/02; A63H 13/04; A63H 3/46
USPC ...................................................... 74/490.05
See application file for complete search history.

(56) References Cited

U.S. PATENT DOCUMENTS

| 8,060,945 | B2 * | 11/2011 | Adarraga ........... A63B 71/1225 2/22 |
| 2009/0282944 | A1 * | 11/2009 | Kim ......................... B25J 18/00 74/490.05 |
| 2018/0200878 | A1 * | 7/2018 | Tsai .......................... A61H 3/00 |
| 2018/0297216 | A1 * | 10/2018 | Nagatsuka ............... B25J 17/00 |

(Continued)

FOREIGN PATENT DOCUMENTS

| CN | 101579860 A | 11/2009 |
| CN | 102240456 A | 11/2011 |

(Continued)

*Primary Examiner* — Jake Cook
*Assistant Examiner* — Gregory Robert Weber
(74) *Attorney, Agent, or Firm* — Timothy T. Wang; Ni. Wang & Massand, PLLC

(57) ABSTRACT

The present disclosure provides a waist joint of humanoid robot and a humanoid robot. The waist joint comprise: tile-shaped structural members, connection members, and substrates. The first end of the first connection member is slidably connected with the first end of the first tile-shaped structural member, and the first end of the second connection member is slidably connected with the second end of the first tile-shaped structural member; one side surface of the first substrate is slidably connected with the first end of the second tile-shaped structural member, and one side surface of the second substrate is slidably connected with the second end of the second tile-shaped structural member; the second end of the first connection member is connected with the third end of the second tile-shaped structural member, and the second end of the second connection member is connected with the fourth end of the second tile-shaped structural member.

19 Claims, 4 Drawing Sheets

(56) References Cited

U.S. PATENT DOCUMENTS

2019/0262211 A1\* 8/2019 Son ................. A63B 21/00181
2020/0230014 A1\* 7/2020 Kim ..................... A61H 1/0266
2020/0338761 A1\* 10/2020 Mugnier ............. B25J 19/0083

FOREIGN PATENT DOCUMENTS

| CN | 207616614 U | 7/2018 | |
|---|---|---|---|
| CN | 108908323 A | 11/2018 | |
| CN | 210256201 U | 4/2020 | |
| JP | 2002178277 A | 6/2002 | |
| KR | 20120076101 A | 7/2012 | |
| WO | WO-2007056790 A1 \* | 5/2007 | .......... B25J 17/0258 |

\* cited by examiner

WAIST JOINT OF HUMANOID ROBOT AND HUMANOID ROBOT

This application claims priority to Chinese Patent Application No. CN 201910626657.1, filed on Jul. 11, 2019, which is hereby incorporated by reference in its entirety.

FILED OF THE INVENTION

The present disclosure relates to the technical field of robotics, and in particular, to a waist joint of a humanoid robot and a humanoid robot.

BACKGROUND

The humanoid robot symbolizes an advanced development stage of the robot technology, which embodies the research and development level of the robot in mechanism, kinematics, dynamics, or the like. With the strong obstacle crossing capability, omnidirectional adjustment of moving direction, strong terrain adaptability, good movement flexibility and high carrying capacity, the humanoid robot is the best choice in a complex operation environment and has wide application prospects.

In order to improve motion stability of the humanoid robot and enable the humanoid robot to complete various actions harmoniously as a human, a waist joint is required to be provided in the humanoid robot. The waist joint needs to not only enable the humanoid robot to rotate flexibly, but also resist impact when collision occurs in the humanoid robot during motion. The humanoid motion performance of the humanoid robot may be achieved only if the two above-mentioned requirements of the waist joint are satisfied at the same time.

SUMMARY

The present disclosure provides a waist joint of a humanoid robot and a humanoid robot to solve one or more problems existing in prior art.

According to an aspect of an embodiment of the present disclosure, there is provided a waist joint of humanoid robot, the waist joint including:

a first tile-shaped structural member, having a first end and a second end which extend along a first arc in a first direction;

a second tile-shaped structural member, having a first end and a second end which extend along a second arc in a second direction perpendicular to the first direction, and a third end and a fourth end disposed opposite to each other; the plane where the first arc is located is perpendicular to the plane where the second arc is located;

a first connection member, having a first end extending in the first direction and a second end disposed opposite to the first end;

a second connection member, having a first end extending in the first direction and a second end disposed opposite to the first end;

a first substrate and a second substrate, both extending in the second direction;

wherein the first end of the first connection member is slidably connected with the first end of the first tile-shaped structural member, and the first end of the second connection member is slidably connected with the second end of the first tile-shaped structural member, so that the first tile-shaped structural member can swing along the first arc; one side surface of the first substrate is slidably connected with the first end of the second tile-shaped structural member, and one side surface of the second substrate is slidably connected with the second end of the second tile-shaped structural member, so that the second tile-shaped structural member can swing along the second arc; the second end of the first connection member is fixedly connected with the third end of the second tile-shaped structural member, and the second end of the second connection member is fixedly connected with the fourth end of the second tile-shaped structural member.

According to another aspect of the embodiment of the present disclosure, there is provided a humanoid robot, which includes: an upper body of a bionic robot, a lower body of the bionic robot, and the waist joint of humanoid robot in the above-mentioned embodiment, wherein the upper body of the bionic robot is connected with the first tile-shaped structural member, and the lower body of the bionic robot is connected with the first and second substrates.

Due to the adoption of a swing tile-shaped structural member, the waist joint of the humanoid robot and humanoid robot according to the embodiment of the present disclosure have a high impact resistance and low requirements for the manufacturing and mounting accuracies.

BRIEF DESCRIPTION OF THE DRAWINGS

To make the technical solutions of the embodiments according to the present disclosure or in the prior art more clear, a brief description of the drawings that are necessary for the illustration of the embodiments or the prior art will be given as follows. Apparently, the drawings described below only illustrate some embodiments of the present disclosure; and for those having ordinary skills in the art, other drawings may be easily obtained from these drawings without paying any creative effort. In the drawings.

DETAILED DESCRIPTION OF THE EMBODIMENTS

To make the objective, technical solution and advantages of the embodiment of the present disclosure more clear, the embodiment of the present disclosure will be further described in detail below in combination with the drawings. Herein, the exemplary embodiment of the present disclosure and the explanation thereof are provided to explain the present disclosure, but are not intended to limit the present disclosure.

The existing waist joint of the humanoid robot usually adopts a tandem structure with the disadvantages of having complex structure, large inertia, or the like, which may be overcome by using a 3-DOF (Degree of Freedom) rotational parallel mechanism. However, the 3-DOF rotational parallel mechanism has a high accuracy requirement for manufacturing and mounting, which results in high costs, weak impact resistance, or the like.

In view of this, the present disclosure provides a waist joint of a humanoid robot and a humanoid robot.

Figure 1:
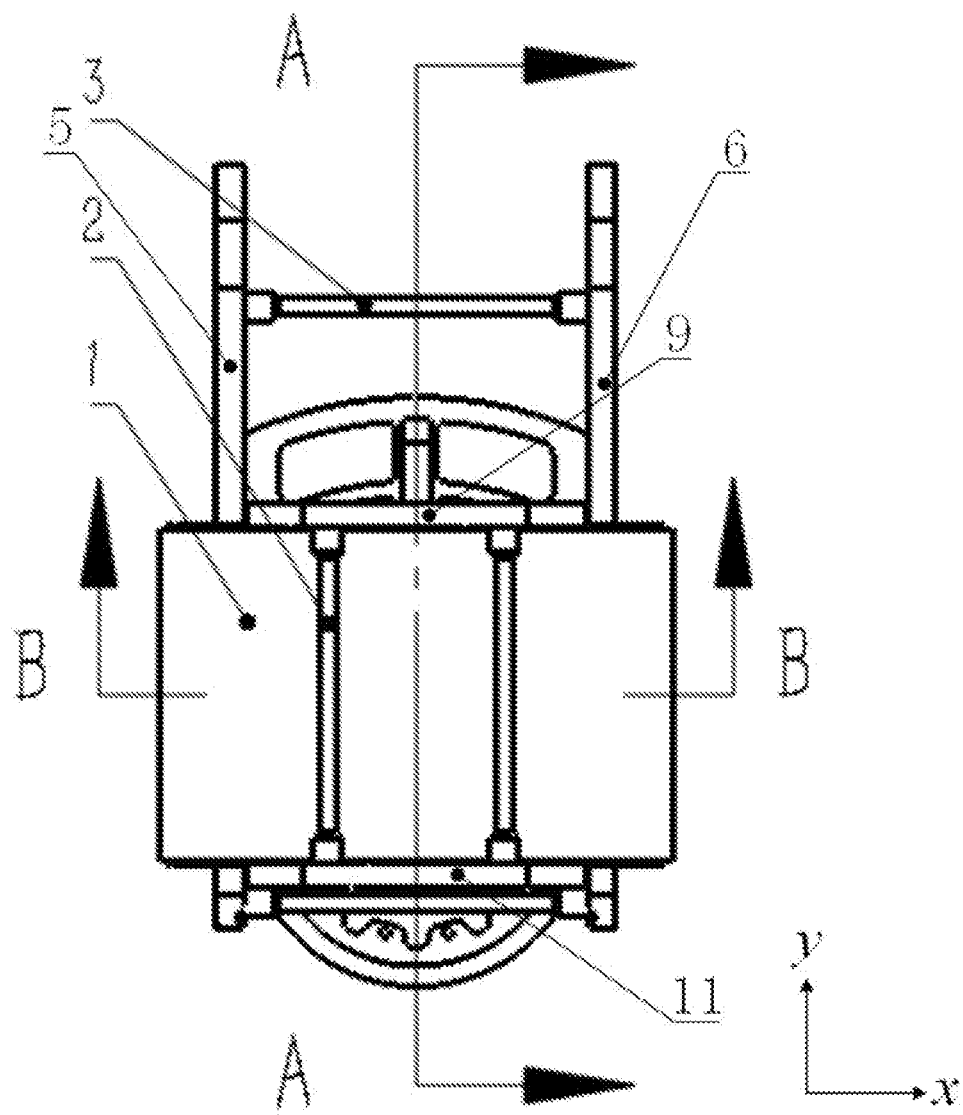
FIG. 1 is a schematic top view of a waist joint of a humanoid robot according to an embodiment of the present disclosure.
Figure 2:
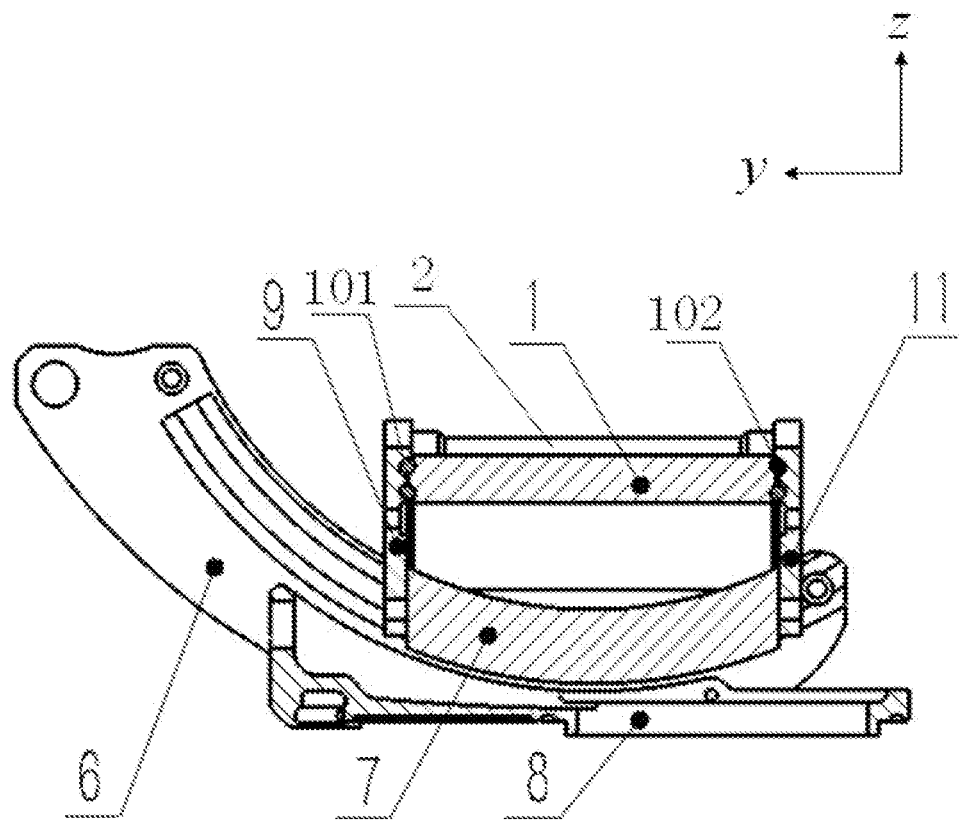
FIG. 2 is a schematic sectional view along line A-A in FIG. 1.
Figure 3:
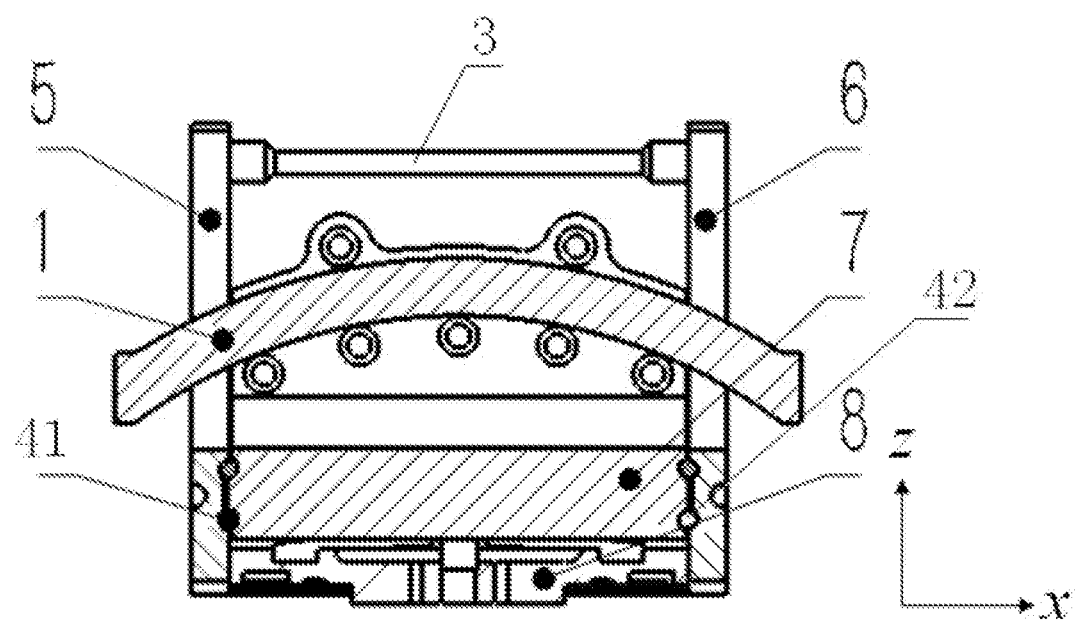
FIG. 3 is a schematic sectional view along line B-B in FIG. 1.

FIG. 1 is a schematic top view of a waist joint of a humanoid robot according to an embodiment of the present disclosure. FIG. 2 is a schematic sectional view along line A-A in FIG. 1. FIG. 3 is a schematic sectional view along line B-B in FIG. 1. For the sake of explanation, FIGS. 1 to 3 illustrate the schematic diagrams of the waist joint of the humanoid robot according to an embodiment of the present disclosure from various perspectives, and are not intend to limit the embodiments of the present disclosure.

Referring to FIGS. 1 to 3, in some embodiments, the waist joint of the humanoid robot may include the following components: a first tile-shaped structural member 1, a second tile-shaped structural member 7, a first connection member 9, a second connection member 11, a first substrate 5, a second substrate 6, and others. Each component of the waist joint of the humanoid robot according to these embodiments will be described in detail below.

The first tile-shaped structural member 1 includes a first end and a second end which extend along a first arc in a first direction x, for example, the upper side and the lower side of the first tile-shaped structural member 1 as shown in FIG. 1. The first arc may refer to a curve which is convex toward a certain side, such as an elliptical arc, a circular arc, an exponential curve, or the like, and thus the first tile-shaped structural member 1 is convex toward one side at least at its first end and second end. In some cases, a plane between the first and second ends of the first tile-shaped structural member 1 may be convex as the first arc, and as shown in FIG. 3, the plane between the first and second ends of the first tile-shaped structural member 1 is convex upwards. The curvature of the first arc or the curvature change in the first arc may be determined according to amplitude, degree or angle of left-right swing or pitching of the humanoid robot.

The second tile-shaped structural member 7 includes a first end and a second end that extend along a second arc in a second direction y perpendicular to the first direction x, and includes a third end and a fourth end that are disposed opposite to each other. The first and second ends of the second tile-shaped structural member 7 may be the left side and the right side of the second tile-shaped structural member 7 as shown in FIG. 3. The third and fourth ends of the second tile-shaped structural member 7 disposed opposite to each other may mean that they are not at two adjacent sides, for example, the left and right sides of the second tile-shaped structural member 7 shown in FIG. 2, extending in the first direction x. Similar to the above-mentioned first arc, the second arc may refer to a curve which is convex toward a certain side, such as an elliptical arc, a circular arc, an exponential curve, or the like, and the second tile-shaped structural member 7 is convex toward one side at least at its first end and second end. In some cases, a plane enclosed by the first, second, third and fourth ends of the second tile-shaped structural member 7 may be convex as the second arc, and as shown in FIG. 2, the plane enclosed by the first, second, third and fourth ends of the second tile-shaped structural member 7 is convex downwards. A curvature of or a curvature change in the second arc may be determined according to amplitude, degree or angle of left-right swing or pitching of the humanoid robot.

The plane x-z, where the above-mentioned first arc is located is perpendicular to the plane y-z where the above-mentioned second arc is located, such that the first and second tile-shaped structural members 1 and 7 are easy to move in a direction at different degrees of freedom. In addition, the curvature of the above-mentioned first or second arc may be the same or different, and may be determined according to whether the left-right swing direction or the elevation direction of the bionic robot is presented, and range of weight shift of the bionic robot.

The first connection member 9 includes a first end extending in the first direction x and a second end disposed opposite to the first end. The first end of the first connection member 9 is limited to extend in the first direction x to be fitted with the first end of the first tile-shaped structural member 1, for example, to extend in a straight direction. The direction in which the second end of the first connection member 9 extends is not limited. For example, the second end of the first connection member 9 may extend in the first direction x, or along a straight line or a curve, so long as it is fitted with the third end of the second tile-shaped structural member 7. The first and second ends of the first connection member 9 disposed opposite to each other may mean that the two ends may be at two non-adjacent sides. For example, the first and second ends of the first connection member 9 are configured as the upper and lower sides of the first connection member 9 as shown in FIG. 2.

The second connection member 11 includes a first end extending in the first direction x and a second end disposed opposite to the first end. The first end of the second connection member 11 is limited to extend in the first direction x to be fitted with the second end of the first tile-shaped structural member 1, for example, to extend in a straight direction. The direction in which the second end of the second connection member 11 extends is not limited. For example, the second end of the second connection member 11 may extend in the first direction x, or along a straight line or a curve, so long as it is fitted with the fourth end of the second tile-shaped structural member 7. The first and second ends of the second connection member 11 disposed opposite to each other may mean that the two ends may be at two non-adjacent sides. For example, the first and second ends of the second connection member 11 are configured as the upper and lower sides of the second connection member 11 as shown in FIG. 2.

Both the first and second substrates 5 and 6 extend in the second direction y. The first and second substrates 5 and 6 extend by a certain length in the second direction y and have a certain width. The first and second substrates 5 and 6 may extend along the second arc in the second direction y; or, although not extending along the second arc, the first and second substrates 5 and 6 extend by a certain length in the second direction y, and then may at least partially form a shape of the above-mentioned second arc. For example, the first and second substrates 5 and 6 both extend in a straight line in the second direction y, with sufficiently large widths, such that the shape of the second arc may be drawn on the first or second substrate 5 or 6.

The first end of the first connection member 9 is slidably connected with the first end of the first tile-shaped structural member 1, and the first end of the second connection member 11 is slidably connected with the second end of the first tile-shaped structural member 1, so that the first tile-shaped structural member 1 can swing along the first arc. The sliding connection thereof may refer to the connection and relative motion of two elements. For example, sliding may be achieved by matching of a track and a slider. The connection or limitation may be achieved by clamping the first tile-shaped structural member 1 from two sides by the first and second connection members 9 and 11.

One side surface of the first substrate 5 is slidably connected with the first end of the second tile-shaped structural member 7, and one side surface of the second substrate 6 is slidably connected with the second end of the second tile-shaped structural member 7, so that the second tile-shaped structural member 7 can swing along the second arc. Said one side surface of the first substrate 5 may be one of the side surfaces or one of the end surfaces, and said one side surface of the second substrate 6 may be one of the side surfaces or one of the end surfaces. As shown in FIG. 3, said one side surface of the first substrate 5 may be the right side of the first substrate 5, and said one side surface of the second substrate 6 may be the left side of the second substrate 6. In the case that the first or second substrate 5 or 6 is slidably connected with the second tile-shaped structural member 7 at different positions, ways of sliding connection may be different. For example, the side surface of the first substrate 5 and the side surface of the second substrate 6 can be clamped at both sides of the second tile-shaped structural member 7 in a manner that the track and a slider match with each other, thereby playing a role of relative motion and limited connection at the same time. In addition, the first and second substrates 5 and 6 may be connected with other parts of the humanoid robot directly or indirectly, for example, with an upper body or a lower body of the humanoid robot.

The second end of the first connection member 9 is fixedly connected with the third end of the second tile-shaped structural member 7, and the second end of the second connection member 11 is fixedly connected with the fourth end of the second tile-shaped structural member 11. Specifically, the fixed connection may be performed by integral molding or bolting. With the fixed connection, the swing range of the first tile-shaped structural member 1 may be better defined, thereby connecting the upper body and lower body of the humanoid robot, and improving the impact resistance of the waist joint of the humanoid robot.

In some embodiments, due to the adoption of the first and second tile-shaped structural members, the first and second connection members are slidably connected with both ends of the first tile-shaped structural member respectively, such that the first tile-shaped structural members wings along the first arc, and the first and second substrates are slidably connected with both ends of the second tile-shaped structural member respectively, such that the second tile-shaped structural member swings along the second arc. Since the plane where the first arc is located is perpendicular to the plane where the second arc is located, the waist joint according to the embodiment of the present disclosure enables the bionic robot to swing left and right and to pitch up and down. In addition, the tile-shaped structural member and the substrate adopted by the waist joint according to the embodiment of the present disclosure have low requirements for the manufacturing and mounting accuracies, and have strong impact resistance.

The waist joint of the humanoid robot according to the above-mentioned embodiment mainly discloses a core conception of enabling the waist joint to swing and do the pitch action by imitating a human body in a simple way. When the waist joint is applied to the humanoid robot, the specific connection method may be determined according to specific situations. For example, the first tile-shaped structural member 1 in the waist joint of the humanoid robot may be configured to connect the upper body of the humanoid robot, and the first and second substrates 5 and 6 may be configured to connect the lower body of the humanoid robot. The above-mentioned first arc may be convex toward the upper body of the humanoid robot, and the second arc may be convex toward the lower body of the humanoid robot. In this way, the humanoid robot may have strong impact resistance.

In a more specific embodiment, referring to FIGS. 2 and 3, a waist base 8 may be provided in the waist joint of the humanoid robot, the first and second substrates 5 and 6 are fixed to the waist base 8, and the waist base 8 is configured to connect the lower body of the humanoid robot, achieving more solid fixation and more convenient installation.

In some other embodiments, the first tile-shaped structural member 1 in the waist joint of the humanoid robot may be configured to connect the lower body of the humanoid robot, and the first and second substrates 5 and 6 may be configured to connect the upper body of the humanoid robot. The above-mentioned first arc may be convex toward the lower body of the humanoid robot, and the above-mentioned second arc may be convex toward the upper body of the humanoid robot. That is, the connection is made upside down, and the similar impact strength may be obtained when the connection mode, size, etc. of each component is appropriately designed.

The waist joint of the bionic robot according to the above-mentioned embodiments may be implemented in various ways. For example, different components may be slidably connected with each other in various ways. The embodiments of the present disclosure will be described below by way of example.

First, the position of a sliding connection will be described by way of example.

In some embodiments, referring to FIG. 2 again, a side edge of the first end of the first connection member 9 may be slidably connected with the end surface of the first end of the first tile-shaped structural member 1, and a side edge of the first end of the second connection member 11 may be slidably connected with the end surface of the second end of the first tile-shaped structural member 1. Wherein, the side edge of the first end of the first connection member 9 and the side edge of the first end of the second connection member 11 may both be inner side edges. Alternatively, the side edge of the first end of the first connection member 9 and the side edge of the first end of the second connection member 11 may both be outer side edges. In this case, the end surface of the first end of the first tile-shaped structural member 1 and the end surface of the second end of the second tile-shaped structural member 7 may be the end surfaces facing inwards correspondingly, for example, by U-shaped bending.

For example, the side edge of the first end of the first connection member 9 may be the upper right edge of the first connection member 9 shown in FIG. 2, and the side edge of the first end of the second connection member 11 may be the upper left edge of the second connection member 11 shown in FIG. 2. The end surface of the first end and the end surface of the second end of the first tile-shaped structural member 1 may be a left end surface and a right end surface of the first tile-shaped structural member 1 shown in FIG. 2 (a normal direction is in the second direction y). In this way, the first and second connection members 9 and 11 may be fixed in a simple manner to limit the first tile-shaped structural member 1.

Referring to FIG. 3 again, one side surface of the first substrate 5 may be slidably connected with the end surface of the first end of the second tile-shaped structural member 7, and one side surface of the second substrate 6 may be slidably connected with the end surface of the second end of the second tile-shaped structural member 7. For example, said one side surface of the first substrate 5 may be the right side of the first substrate 5 shown in FIG. 3, and said one side surface of the second substrate 6 may be the left side of the second substrate 6 shown in FIG. 3. In this way, the first and second substrates 5 and 6 may be fixed in a simple manner to limit the second tile-shaped structural member 7.

In some other embodiments, the end surface of the first end of the first connection member 9 may be slidably connected with the side edge of the first end of the first tile-shaped structural member 1, and the end surface of the first end of the second connection member 11 may be slidably connected with the side edge of the second end of the first tile-shaped structural member 1. In this case, the first tile-shaped structural member 1 may be fixed using an appropriate structural component; and the one end surface of the first substrate 5 may be slidably connected with the side edge of the first end of the second tile-shaped structural member 7, and one end surface of the second substrate 6 may be slidably connected with the side edge of the second end of the second tile-shaped structural member 7, in this case, the second tile-shaped structural member 7 may be fixed with an appropriate structural component.

Next, the way of sliding connection will be described by way of example.

In some embodiments, referring to FIG. 2, the waist joint of the humanoid robot according to each of the above-mentioned embodiments may further comprise at least one first rolling element 101 and at least one second rolling element 102; referring to FIG. 3, the waist, joint of the humanoid robot according to each of the above-mentioned embodiments may further comprise at least one third rolling element 41 and at least one fourth rolling element 42.

Referring to FIG. 2 again, the side edge of the first end of the first connection member 9 may include at least one rolling track, and the end surface of the first end of the first tile-shaped structural member 1 includes at least one rolling track. For example, the rolling track of the first connection member 9 and the rolling track of the first tile-shaped structural member 1 may be perpendicular to the principal plane shown in FIG. 2, i.e., a first direction x. The side edge of the first end of the second connection member 11 may include at least one rolling track, and the end surface of the second end of the second tile-shaped structural member 7 may include at least one rolling track.

The first rolling element 101 is engaged with the corresponding rolling track. For example, the first rolling element 101 may be embedded between the rolling track at the side edge of the first end of the first connection member 9 and the rolling track at the end surface of the first end of the first tile-shaped structural member 1. The second rolling element 102 is engaged with the corresponding rolling track. For example, the second rolling element 102 may be embedded between the rolling track at the side edge of the first end of the second connection member 1 land the rolling track at the end surface of the second end of the first tile-shaped structural member 1.

Referring to FIG. 3 again, one side surface of the first substrate 5 may include at least one rolling track, and the end surface of the first end of the second tile-shaped structural member 7 may include at least one rolling track. For example, the rolling track at the side surface (right side surface) of the first substrate 5 and the rolling track at the end surface of the first end of the second tile-shaped structural member 7 may be perpendicular to the principal plane shown in FIG. 3, i.e., a second direction y. One side surface of the second substrate 6 may include at least one rolling track, and the end surface of the second end of the second tile-shaped structural member 7 may include at least one rolling track. For example, the rolling track at the side surface (left side surface) of the second substrate 6 and the rolling track at the end surface of the second end of the second tile-shaped structural member 7 may be perpendicular to the principal plane shown in FIG. 3, i.e., a second direction y.

The third rolling element 41 is engaged with the corresponding rolling track. For example, the third rolling element 41 may be embedded between the rolling track at said one side surface of the first substrate 5 and the rolling track at the end surface of the first end of the second tile-shaped structural member 7. The fourth rolling element 42 is engaged with the corresponding rolling track. For example, the fourth rolling element 42 may be embedded between the rolling track at said one side surface of the second substrate 6 and the rolling track at the end surface of the second end of the second tile-shaped structural member 7.

The number of rolling tracks of respective components (including the first connection member 9, the second connection member 11, the first tile-shaped structural member 1, the first substrate 5, the second substrate 6, and the second tile-shaped structural member 7) may be set as required, for example, one, two, three, or others. The number of rolling tracks of components in which the same rolling elements are embedded may be the same. For example, the number of rolling tracks of the first connection member 9 may be the same as the number of rolling tracks at the end surface of the first end of the first tile-shaped structural member 1, the number of rolling tracks of the second connection member 11 may be the same as the number of rolling tracks at the end surface of the second end of the first tile-shaped structural member 1, the number of rolling tracks of the first substrate 5 may be the same as the number of rolling tracks at the end surface of the first end of the second tile-shaped structural member 7, and the number of rolling tracks of the second substrate 6 may be the same as the number of rolling tracks at the end surface of the second end of the second tile-shaped structural member 7.

In some embodiments, at least one of the first, second, third and fourth rolling elements 101, 102, 41 and 42 may be configured as balls. At least one of the rolling track at the side edge of the first end of the first connection member 9, the rolling track at the end surface of the first end of the first tile-shaped structural member 1, the rolling track at the side edge of the first end of the second connection member 11, the rolling track at the end surface of the second end of the first tile-shaped structural member 1, the rolling track at one side surface of the first substrate 5, the rolling track at the end surface of the first end of the second tile-shaped structural member 7, the rolling track at one side surface of the second substrate 5 and the rolling track at the end surface of the second end of the second tile-shaped structural member 7 is configured as a groove-type rolling track. The rolling elements correspond to the rolling track in position. A size of a notch of the groove-type rolling track may be determined based on the size of the balls.

The number of balls may be matched with the corresponding rolling track. For example, the number of balls (the first rolling elements 101) embedded between the rolling track at the side edge of the first end of the first connection member 9 and the rolling track at the end surface of the first end of the first tile-shaped structural member 1 may be determined based on the length of the rolling track at the side edge of the first end of the first connection member 9 and the length of the rolling track at the end surface of the first end of the first tile-shaped structural member 1. The number of balls (the second rolling elements 102) embedded between the rolling track at the side edge of the first end of the second connection member 11 and the rolling track at the end surface of the second end of the first tile-shaped structural member 1 may be determined based on the length of the rolling track at the side edge of the first end of the second connection member 11 and the length of the rolling track at the end surface of the second end of the first tile-shaped structural member 1. The number of balls (the third rolling elements 41) embedded between the rolling track at one side surface of the first substrate 5 and the rolling track at the end surface of the first end of the second tile-shaped structural member 7 may be determined based on the length of the rolling track at one side surface of the first substrate 5 and the length of the rolling track at the end surface of the first end of the second tile-shaped structural member 7. The number of balls (the fourth rolling element 42) embedded between the rolling track at one side surface of the second substrate 6 and the rolling track at the end surface of the second end of the second tile-shaped structural member 7 may be determined based on the length of the rolling track at one side surface of the second substrate 6 and the length of the rolling track at the end surface of the second end of the second tile-shaped structural member 7. For example, the number of balls embedded in each rolling track may be determined according to the standard that the length of the arranged balls is proportional to the length of the rolling track, for example, 1:2, 1:1, or the like, as the proportion. Specifically, the rolling track may be filled with the balls embedded therein.

In some embodiments, the slidable connection between the components can be achieved by engaging the balls and the groove-type rolling track, so as to be manufactured simply and mounted easily. Moreover, the simple configuration enables the waist joint to have stronger impact resistance.

In some other embodiments, the rolling tracks of respective components (including the first connection member 9, the second connection member 11, the first tile-shaped structural member 1, the first substrate 5, the second substrate 6, and the second tile-shaped structural member 7) may be configured as guide rails. Respective rolling elements (including the first, second, third and fourth rolling elements 101, 102, 41 and 42) may have wheel-shaped structural members.

Further, the fixed connection relationship of the components will be exemplified.

In the waist joint of the humanoid robot, the first and second connection members 9 and 11 may play a role of transition connection, for connecting the components that swing at different degrees of freedom. If the first tile-shaped structural member 1 is defined by the first end of the first connection member 9 and the first end of the second connection member 11, the two connection members are required to be fixed together in some ways. In some embodiments, the first end of the first connection member 9 and the first end of the second connection member 11 may be fixedly connected by using a support. Specifically, referring to FIG. 1, the waist joint of the humanoid robot in the above-mentioned embodiments may further include at least one first support 2 which may be configured to connect the first end of the first connection member 9 with the first end of the second connection member 11. The number of first supports 2 may be one or more, for example, two. The first support 2 may be of a bar shape, an elongated shape, or others.

In some embodiments, the first support 2 may be configured to detachably connect the first end of the first connection member 9 with the first end of the second connection member 11. For example, the first support 2 may be connected with the first end of the first connection member 9 and the first end of the second connection member 11 by screws or bolts. In this case, the first end of the first connection member 9 and the first end of the second connection member 11 may be provided with corresponding screw holes, threads, or the like. Or, the first support 2 may be in snap joint to the first end of the first connection member 9 and the first end of the second connection member 11. In the present embodiment, the detachable connection may facilitate the installation of the first tile-shaped structural member 1, or the like, thereby facilitating the installation of the waist joint of the humanoid robot. In some other embodiments, the first support 2 may be fixedly connected to the first end of the first connection member 9 and the first end of the second connection member 11. In this case, the first tile-shaped structural member may be mounted or detached in a direction where the first tile-shaped structural member 1 swings.

In the waist joint of humanoid robot, the first and second substrates 5 and 6 may function to be connected with some other part (the lower body or the upper body) of the humanoid robot directly or indirectly. The first and second substrates 5 and 6 may be fixed in an appropriate manner. For example, referring to FIG. 1, the waist joint of humanoid robot according to each of the above-mentioned embodiments may further include at least one second support 3 which may be configured to connect the first and second substrates 5 and 6. The number of second supports 3 may be one or more, for example, two. The second support 3 may be of a bar shape, an elongated shape, or the like.

In some embodiments, the second support 3 may be configured to detachably connect the first and second substrates 5 and 6. For example, the second support 3 may be connected with the first and second substrates 5 and 6 by screws or bolts. In this case, the first and second substrates 5 and 6 may be provided with corresponding screw holes, threads, or the like. Or, the second support 3 may be in snap joint to the first and second substrates 5 and 6. In the present embodiment, the detachable connection may facilitate the installation of the second tile-shaped structural member 7, or the like, thereby facilitating the installation of the waist joint of humanoid robot. In other embodiments, the second support 3 may be fixedly connected to the first and second substrates 5 and 6.

In order to enable those skilled in the art to better understand the present disclosure, the embodiment of the present disclosure will be described below by way of specific examples.

As shown in FIGS. 1 to 3, the waist joint of humanoid robot according to some embodiments may include the first tile-shaped structural member (waist swing slide plate), 1 the first support (support rod) 2, the second support (support rod) 3, the first rolling element (ball) 41, the second rolling element (ball) 42, the first substrate 5 (waist pitching left substrate), the second substrate 6 (waist pitching right substrate), the second tile-shaped structural member 7 (waist pitching slide plate), the waist base 8, the first connection member 9 (waist swing rear substrate), the third rolling element (ball) 101, the fourth rolling element (ball) 102, the second connection member (waist swing front substrate) 11, or others.

Two rolling tracks may be provided at each of front and rear sides of the first tile-shaped structural member 1. The first tile-shaped structural member 1 may be configured to be fixedly connected with the upper body of the humanoid robot. The first tile-shaped structural member 1 may be taken as the waist swing slide plate which is fixedly connected with the upper body of the humanoid robot integrally, whereby improving the rigidity and stability of the upper body of the humanoid robot.

Two first supports 2 may be separately fixedly mounted with the first and second connection members 9 and 1 at either of left and right sides by screws. The first support 2 may be configured as a support rod. The connection by the support helps improve the integral rigidity of the waist swing substrate and reduce the shake of the upper body when the robot is in motion.

Two second supports 3 may be separately fixedly mounted with the first and second substrates 5 and 6 at either of front and back sides by screws. The second support 3 may be configured as a support rod. The connection by the supports helps improve the integral rigidity of the waist pitching substrate and reduce the shake of the upper body when the robot is in motion.

Two rows of first rolling elements 41 and two rows of second rolling elements 42 are disposed at either of left and right sides of the second tile-shaped structural member 7 respectively. Two rolling tracks may be provided at each of the left and right sides of the second tile-shaped structural member 7. The first and second rolling elements 41 and 42 may be configured as balls, and the balls are arranged uniformly along the rolling tracks via which the second tile-shaped structural member 7 is matched with the first and second substrates 5 and 6 respectively. The number of each row of balls may be subject to the length of the rolling track. The upper body of the humanoid robot may be supported by engaging the balls with the rolling tracks. Two rows of rolling tracks and balls may be arranged at each of the left and right sides, which contributes to improving the impact resistance of the humanoid robot, the balls rolling at the rolling tracks realizing the pitching action of the upper body of the humanoid robot.

The first and second substrates 5 and 6 may be fixedly mounted at the left and right sides of the waist base 8 respectively. The waist base 8 may be configured to be fixedly connected with the lower body of the humanoid robot. The first and second substrates 5 and 6 may serve as waist pitching substrates. The waist pitching substrate forms a closure by the fixed connection of the support rod. The waist base is fixedly connected with the lower body of the humanoid robot integrally, which may improve the rigidity and stability of the waist joint of the humanoid robot.

The first and second connection members 9 and 11 may be fixedly mounted at front and rear sides of the second tile-shaped structural member 7 respectively. The first and second connection members 9 and 11 may serve as waist swing substrates. The waist swing substrate forms a closure by the fixed connection of the support rod, which constitutes the connection member of waist pitching and waist swing, improving the rigidity and stability of the waist joint of the robot.

Two rows of third rolling elements 101 and two rows of fourth rolling elements 102 may be provided at the front and rear sides of the first tile-shaped structural member 1 respectively. The third and fourth rolling elements 101 and 102 may be balls, and the balls are arranged uniformly along the rolling track in which the first tile-shaped structural member 1 is matched with the first and second connection members 9 and 11 respectively. The number of each row of balls may be subject to the length of the rolling track. The upper body of the humanoid robot may be supported by engaging the balls with the rolling tracks. Two rows of rolling tracks and balls may be arranged at each of the front and rear sides, which contributes to improving the impact resistance of the humanoid robot, the balls rolling at the rolling tracks realizing the swing action of the upper body of the humanoid robot.

In the present embodiment, the waist joint of humanoid robot may be taken as a rotation position of the humanoid robot. When the humanoid robot is in motion, the upper body may swing left and right by rolling of the balls, since the waist swing slide plate is fixedly connected with the upper body, the rolling tracks at the front and rear sides of the waist swing slide plate are matched and mounted with the rolling track of the waist swing substrate by means of balls; the upper body may be pitched back and forth by rolling of the balls, since the waist pitching slide plate is fixed to the waist swing substrate, and the rolling tracks at the left and right sides of the waist pitching slide plate are matched and mounted with the rolling track of the waist pitching substrate by means of balls, thereby implementing various actions of the robot. Since a tile-shaped matching structure is adopted subtly, the waist joint of humanoid robot according to the embodiment of the present disclosure may do the pitching and swing actions of the humanoid robot in a limited space, spin in cooperation with the waist of the humanoid robot, and do 3-DOF rotational action when the humanoid robot is in motion. The tile matching structure (swing tile-shaped structural member) has a high impact resistance, enables the humanoid robot to maintain operate normally under the walking and jumping impact of the robot, has low requirements for manufacturing and mounting accuracies, and greatly reduces the weight of the entire joint by optimizing the structural space of the waist joint, thereby improving the motion performance and environmental adaptability of the humanoid robot. The waist joint of the humanoid robot according to the present embodiment may overcome the problems that each rotational axis is required to converge on one spatial point and the requirement for the manufacturing and mounting accuracies is high in the existing 3-DOF rotational parallel mechanism, such as a spherical mechanism, and also overcome the problems result from complicated structure, high manufacturing costs, heavy weight and low impact resistance in the mechanism, such as 3-RUU, argos, or the like.

Figure 4:
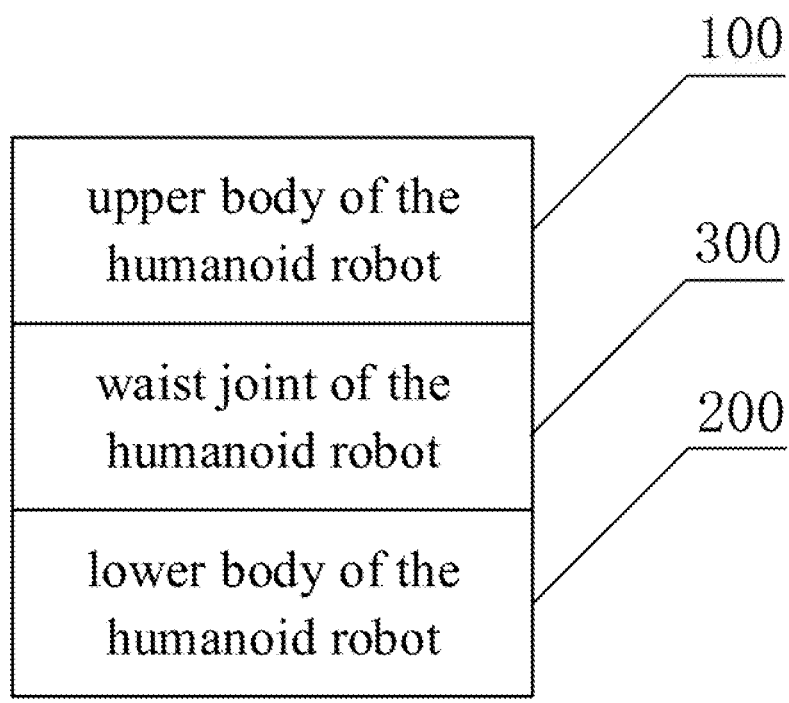
FIG. 4 is a schematic structural diagram of a humanoid robot according to an embodiment of the present disclosure.

In addition, the embodiment of the present disclosure also provides a humanoid robot. FIG. 4 is a schematic structural diagram of a humanoid robot according to an embodiment of the present disclosure. Referring to FIG. 4, the humanoid robot according to some embodiments may include an upper body 100 of the bionic robot, a lower body 200 of the bionic robot, and the waist joint 300 of humanoid robot. The embodiment of the waist joint 300 of humanoid robot may be known from the description of the above-mentioned embodiments, and thus is not needed to repeat herein. The specific structures of the upper body 100 and the lower body 200 of the bionic robot are not limited, as long as it may be connected with the waist joint 300 of humanoid robot.

In the waist joint of humanoid robot according to each embodiment of the present disclosure, referring to FIGS. 1 to 3, the first tile-shaped structural member 1, the first substrate 5, and the second substrate 6, or others are provided, wherein the upper body 100 of the bionic robot may be connected with the first tile-shaped structural member 1, and the lower body 200 of the bionic robot may be connected with the first and second substrates 5 and 6. Specifically, the lower body 200 of the bionic robot may be connected with the first and second substrates 5 and 6 directly or indirectly. For example, the waist base 8 is further provided in the waist joint of humanoid robot, and then the lower body 200 of the bionic robot may be connected with the first and second substrates 5 and 6 via the waist base 8. Specifically, the first and second substrates 5 and 6 may be fixed to the waist base 8, and the waist base 8 is configured to be connected to the lower body 200 of the humanoid robot.

In the present embodiment, by connecting the upper body 100 of the bionic robot with the first tile-shaped structural member 1, and connecting the first and second substrates 5 and 6 with the lower body 200 of the bionic robot, the stability and impact resistance of the humanoid robot may be improved.

In summary, due to the adoption of the swing tile-shaped structural member, the waist joint of humanoid robot and the humanoid robot according to the embodiment of the present disclosure has a high impact resistance and a low requirement for the manufacturing and mounting accuracies.

In the description of the present specification, the phrases used throughout this specification such as "an embodiment", "an specific embodiment", "some embodiments", "for example", "such as", "specific example" or "some examples" means that a particular feature, structure, material, or characteristic described in connection with the embodiment or example is included in at least one embodiment or example of the present disclosure. In the specification, the schematic expressions to the above-mentioned phrases are not necessarily referring to the same embodiment or example. Furthermore, the described particular features, structures, materials, or characteristics may be combined in any suitable manner in one or more embodiments or examples. The sequence of steps involved in each embodiment is used to schematically illustrate the implementation of the present disclosure, is not limited, and may be appropriately adjusted as needed.

The objective, technical solution and advantageous effects of the present disclosure are further described in detail in the foregoing embodiments. It should be understood that the foregoing description is merely the embodiment of the present disclosure, not for limiting the protection scope of the present disclosure. Various modifications, equivalent substitutions, improvements, or the like within the spirit and principle of the present disclosure shall fall within the protection scope of the present disclosure.

What is claimed is:

1. A waist joint of a humanoid robot, comprising:
   a first curved plate, wherein a first cross-section of the first curved plate on a first plane is in a shape of a first arc, a second cross-section of the first curved plate on a second plane is in a shape of a first line, a first end and a second end of the first arc are on a first linear axis on the first plane, the second plane where the first line located being perpendicular to the first linear axis and the first plane where the first arc located;
   a second curved plate, wherein a first cross-section of the second curved plate on the first plane is in a shape of a second line, a second cross-section of the second curved plate on the second plane is in a shape of a second arc, a first end and a second end of the second arc are on a second linear axis perpendicular to the first linear axis, and a third end and a fourth end of the second line are disposed opposite to each other;
   a first connection member, having a first end extending along the direction of the first linear axis and a second end disposed opposite to the first end;
   a second connection member, having a first end extending along the direction of the first linear axis and a second end disposed opposite to the first end;
   a first substrate and a second substrate, both extending along the direction of the second linear axis;
   wherein the first end of the first connection member is slidably connected with the first end of the first curved plate, and the first end of the second connection member is slidably connected with the second end of the first curved plate, so that the first curved plate can swing along the first arc; one side surface of the first substrate is slidably connected with the first end of the second curved plate, and one side surface of the second substrate is slidably connected with the second end of the second curved plate, so that the second curved plate can swing along the second arc; the second end of the first connection member is fixedly connected with the third end of the second curved plate, and the second end of the second connection member is fixedly connected with the fourth end of the second curved plate; and
   wherein the first curved plate is used to be connected to an upper body of the humanoid robot; the first substrate and the second substrate are used to be connected to a lower body of the humanoid robot; the first arc is convex toward the upper body of the humanoid robot; the second arc is convex toward the lower body of the humanoid robot.

2. The waist joint of the humanoid robot according to claim 1, wherein a side edge of the first end of the first connection member is slidably connected with an end surface of the first end of the first curved plate, a side edge of the first end of the second connection member is slidably connected with an end surface of the second end of the first curved plate; said one side surface of the first substrate is slidably connected with the end surface of the first end of the second curved plate, and said one side surface of the second substrate is slidably connected with the end surface of the second end of the second curved plate.

3. The waist joint of the humanoid robot according to claim 2, further comprising: at least one first rolling element, at least one second rolling element, at least one third rolling element, and at least one fourth rolling element;
   the side edge of the first end of the first connection member comprises at least one rolling track; the end surface of the first end of the first curved plate comprises at least one rolling track; the side edge of the first end of the second connection member comprises at least one rolling track; and the end surface of the second end of the second curved plate comprises at least one rolling track;
   the first rolling element is embedded between the rolling track at the side edge of the first end of the first connection member and the rolling track at the end surface of the first end of the first curved plate; the second rolling element is embedded between the rolling track at the side edge of the first end of the second connection member and the rolling track at the end surface of the second end of the first curved plate;
   said one side surface of the first substrate comprises at least one rolling track; the end surface of the first end of the second curved plate comprises at least one rolling track; said one side surface of the second substrate comprises at least one rolling track; the end surface of the second end of the second curved plate comprises at least one rolling track;
   the third rolling element is embedded between the rolling track at said one side surface of the first substrate and the rolling track at the end surface of the first end of the second curved plate; the fourth rolling element is embedded between the rolling track at said one surface of the second substrate and the rolling track at the end surface of the second end of the second curved plate.

4. The waist joint of the humanoid robot according to claim 3, wherein the first, second, third and fourth rolling elements are balls;
the rolling track at the side edge of the first end of the first connection member, the rolling track at the end surface of the first end of the first curved plate, the rolling track at the side edge of the first end of the second connection member, the rolling track at the end surface of the second end of the first curved plate, the rolling track at said one side surface of the first substrate, the rolling track at the end surface of the first end of the second curved plate, the rolling track at said one side surface of the second substrate and the rolling track at the end surface of the second end of the second curved plate are groove-type rolling tracks.

5. The waist joint of the humanoid robot according to claim 4, wherein
the number of balls embedded between the rolling track at the side edge of the first end of the first connection member and the rolling track at the end surface of the first end of the first curved plate is determined based on the length of the rolling track at the side edge of the first end of the first connection member and the length of the rolling track at the end surface of the first end of the first curved plate;
the number of balls embedded between the rolling track at the side edge of the first end of the second connection member and the rolling track at the end surface of the second end of the first curved plate is determined based on the length of the rolling track at the side edge of the first end of the second connection member and the length of the rolling track at the end surface of the second end of the first curved plate;
the number of balls embedded between the rolling track at said one side surface of the first substrate and the rolling track at the end surface of the first end of the second curved plate is determined based on the length of the rolling track at said one side surface of the first substrate and the length of the rolling track at the end surface of the first end of the second curved plate:
the number of balls embedded between the rolling track at said one side surface of the second substrate and the rolling track at the end surface of the second end of the second curved plate is determined based on the length of the rolling track at said one side surface of the second substrate and the length of the rolling track at the end surface of the second end of the second curved plate.

6. The waist joint of the humanoid robot according to claim 1, further comprising: at least one first support and at least one second support;
the first support is configured to connect the first end of the first connection member and the first end of the second connection member; the second support is configured to connect the first substrate and the second substrate.

7. The waist joint of the humanoid robot according to claim 6, wherein the first support is configured to detachably connect the first end of the first connection member and the first end of the second connection member; the second support is configured to detachably connect the first substrate and the second substrate.

8. The waist joint of the humanoid robot according to claim 1, wherein the first linear axis is x axis of a plane rectangular coordinate system, the second linear axis is y axis of the plane rectangular coordinate system, the first plane is the plane x-z, and the second plane is the plane y-z.

9. The waist joint of the humanoid robot according to claim 8, further comprising: a waist base;
the first substrate and the second substrates are fixed to the waist base, and the waist base is used to be connected to the lower body of the humanoid robot.

10. A humanoid robot, comprising: an upper body of a bionic robot, a lower body of the bionic robot, and a waist joint;
the upper body of the bionic robot is connected with a first curved plate, and the lower body of the bionic robot is connected with a first substrate and a second substrate;
wherein the waist joint comprises:
the first curved plate, wherein a first cross-section of the first curved plate on a first plane is in a shape of a first arc, a second cross-section of the first curved plate on a second plane is in a shape of a first line, a first end and a second end of the first arc are on a first linear axis on the first plane, the second plane where the first line located being perpendicular to the first linear axis and the first plane where the first arc located;
a second curved plate, wherein a first cross-section of the second curved plate on the first plane is in a shape of a second line, a second cross-section of the second curved plate on the second plane is in a shape of a second arc, a first end and a second end of the second arc are on a second linear axis perpendicular to the first linear axis, and a third end and a fourth end of the second line are disposed opposite to each other;
a first connection member, having a first end extending along the direction of the first linear axis and a second end disposed opposite to the first end;
a second connection member, having a first end extending along the direction of the first linear axis and a second end disposed opposite to the first end;
the first substrate and the second substrate, both extending along the direction of the second linear axis;
wherein the first end of the first connection member is slidably connected with the first end of the first curved plate, and the first end of the second connection member is slidably connected with the second end of the first curved plate, so that the first curved plate can swing along the first arc; one side surface of the first substrate is slidably connected with the first end of the second curved plate, and one side surface of the second substrate is slidably connected with the second end of the second curved plate, so that the second curved plate can swing along the second arc; the second end of the first connection member is fixedly connected with the third end of the second curved plate, and the second end of the second connection member is fixedly connected with the fourth end of the second curved plate; and
wherein the first curved plate is used to be connected to an upper body of the humanoid robot; the first substrate and the second substrate are used to be connected to a lower body of the humanoid robot; the first arc is convex toward the upper body of the humanoid robot; the second arc is convex toward the lower body of the humanoid robot.

11. The humanoid robot according to claim 10, wherein a side edge of the first end of the first connection member is slidably connected with an end surface of the first end of the first curved plate, a side edge of the first end of the second connection member is slidably connected with an end surface of the second end of the first curved plate; said one side surface of the first substrate is slidably connected with the end surface of the first end of the second curved plate, and said one side surface of the second substrate is slidably connected with the end surface of the second end of the second curved plate.

12. The humanoid robot according to claim 11, further comprising: at least one first rolling element, at least one second rolling element, at least one third rolling element, and at least one fourth rolling element;

the side edge of the first end of the first connection member comprises at least one rolling track; the end surface of the first end of the first carved plate comprises at least one rolling track; the side edge of the first end of the second connection member comprises at least one rolling track; and the end surface of the second end of the second curved plate comprises at least one rolling track;

the first rolling element is embedded between the rolling track at the side edge of the first end of the first connection member and the rolling track at the end surface of the first end of the first curved plate; the second rolling element is embedded between the rolling track at the side edge of the first end of the second connection member and the rolling track at the end surface of the second end of the first curved plate;

said one side surface of the first substrate comprises at least one rolling track; the end surface of the first end of the second curved plate comprises at least one rolling track; said one side surface of the second substrate comprises at least one rolling track; the end surface of the second end of the second curved plate comprises at least one rolling track;

the third rolling element is embedded between the rolling track at said one side surface of the first substrate and the rolling track at the end surface of the first end of the second curved plate; the fourth rolling element is embedded between the rolling track at said one surface of the second substrate and the rolling track at the end surface of the second end of the second curved plate.

13. The humanoid robot according to claim 12, wherein the first, second, third and fourth rolling elements are balls;

the rolling track at the side edge of the first end of the first connection member, the rolling track at the end surface of the first end of the first curved plate, the rolling track at the side edge of the first end of the second connection member, the rolling track at the end surface of the second end of the first curved plate, the rolling track at said one side surface of the first substrate, the rolling track at the end surface of the first end of the second curved plate, the rolling track at said one side surface of the second substrate and the rolling track at the end surface of the second end of the second curved plate are groove-type rolling tracks.

14. The humanoid robot according to claim 13, wherein the number of balls embedded between the rolling track at the side edge of the first end of the first connection member and the rolling track at the end surface of the first end of the first curved plate is determined based on the length of the rolling track at the side edge of the first end of the first connection member and the length of the rolling track at the end surface of the first end of the first curved plate;

the number of balls embedded between the rolling track at the side edge of the first end of the second connection member and the rolling track at the end surface of the second end of the first curved plate is determined based on the length of the rolling track at the side edge of the first end of the second connection member and the length of the rolling track at the end surface of the second end of the first curved plate;

the number of balls embedded between the rolling track at said one side surface of the first substrate and the rolling track at the end surface of the first end of the second curved plate is determined based on the length of the rolling track at said one side surface of the first substrate and the length of the rolling track at the end surface of the first end of the second curved plate;

the number of balls embedded between the rolling track at said one side surface of the second substrate and the rolling track at the end surface of the second end of the second curved plate is determined based on the length of the rolling track at said one side surface of the second substrate and the length of the rolling track at the end surface of the second end of the second curved plate.

15. The humanoid robot according to claim 10, further comprising: at least one first support and at least one second support;

the first support is configured to connect the first end of the first connection member and the first end of the second connection member; the second support is configured to connect the first substrate and the second substrate.

16. The humanoid robot according to claim 15, wherein the first support is configured to detachably connect the first end of the first connection member and the first end of the second connection member; the second support is configured to detachably connect the first substrate and the second substrate.

17. The humanoid robot according to claim 10, wherein the first curved plate is used to be connected to upper body of the humanoid robot; the first substrate and the second substrate are used to be connected to lower body of the humanoid robot; the first arc is convex toward the upper body of the humanoid robot; the second arc is convex toward the lower body of the humanoid robot.

18. The humanoid robot according to claim 17, further comprising: a waist base;

the first substrate and the second substrate are fixed to the waist base, and the waist base is used to be connected to the lower body of the humanoid robot.

19. The humanoid robot according to claim 10, wherein the first linear axis is x axis of a plane rectangular coordinate system, the second linear axis is y axis of the plane rectangular coordinate system, the first plane is the plane x-z, and the second plane is the plane y-z.

* * * * *